United States Patent [19]

Rieck

[11] Patent Number: 4,585,642

[45] Date of Patent: Apr. 29, 1986

[54] PROCESS FOR THE PREPARATION OF CRYSTALLINE SODIUM SILICATES

[75] Inventor: Hans-Peter Rieck, Hofheim am Taunus, Fed. Rep. of Germany

[73] Assignee: Hoechst Aktiengesellschaft, Fed. Rep. of Germany

[21] Appl. No.: 732,418

[22] Filed: May 9, 1985

[30] Foreign Application Priority Data

May 12, 1984 [DE] Fed. Rep. of Germany ....... 3417649

[51] Int. Cl.$^4$ ............................................. C01B 33/32
[52] U.S. Cl. ..................................... 423/333; 423/332
[58] Field of Search ........................ 423/332, 333, 326

[56] References Cited

U.S. PATENT DOCUMENTS 2,795,485  6/1957  Manchot ............................. 423/332
3,377,134  4/1968  Baker et al. ......................... 423/332

Primary Examiner—John Doll
Assistant Examiner—Lance Johnson
Attorney, Agent, or Firm—Connolly and Hutz

[57] ABSTRACT

A process for the preparation of crystalline sodium silicates with a molar ratio $SiO_2/Na_2O$ of 1.9:1 to 3.5:1 from amorphous sodium silicate is described. To water-containing amorphous sodium silicate with a molar ratio $SiO_2/Na_2O$ of 1.7:1 to 3.75:1 and a water content of 5 to 95% by weight is added 0.01 to 30 parts by weight of the crystalline sodium silicate to be prepared (per 100 parts by weight of $Na_2O+SiO_2$ in the water-containing amorphous sodium silicate).

The reaction mixture is dehydrated by heating. The dehydrated reaction mixture is kept at a temperature of at least 450° C., but below the melting point, until the sodium silicate has crystallized.

11 Claims, No Drawings

PROCESS FOR THE PREPARATION OF CRYSTALLINE SODIUM SILICATES

The present invention relates to a process for the preparation crystalline sodium silicates with a molar ratio of $SiO_2/Na_2O$ of 1.9:1 to 3.5:1 from amorphous sodium silicates at elevated temperature.

The various known crystalline sodium silicates can be differentiated from one another by their composition—sometimes given only as the $Na_2O:SiO_2$ ratio—and by their X-ray diffraction diagram, which is specific in each particular case. A sodium silicate of unchanged composition but different crystal structure can frequently be prepared. The individual forms in general differ from one another—although sometimes slightly—in their physical and chemical properties.

One of the typical properties of the crystalline sodium silicates is that they can be converted into free silicic acids with equivalent amounts of hydrochloric acid or sulfuric acid. The amount of acid required for this defines the ion exchange capacity of the sodium silicate and can be determined by titration.

The crystalline sodium salts of silicic acids with an $Na_2O:SiO_2$ ratio of 1:2 to 1:3 are usually prepared by heating sodium silicate glasses or by heating sodium carbonate and quartz (German Offenlegungsschrift No. 3,100,942).

Willgallis and Range (Glastechn. Ber., 37, 194–200 (1964) describe the preparation of $\alpha$-, $\beta$- and $\delta$-$Na_2Si_2O_5$ by heating molten and non-molten dehydrated sodawater glass. They demonstrate that various crystal forms are obtained, depending on the temperature. It is not possible to prepare $\delta$-$Na_2Si_2O_5$ by this process.

Benecke and Lagaly describe a process for the preparation of a hydrated sodium silicate with a canemite structure in Am. Mineral., 62, 763–771 (1077). $SiO_2$ is dispersed in methanol in a first step, and cold sodium hydroxide solution is added.

The process described there is not only relatively expensive in respect of the controlled addition of the individual substances, but also necessitates particular safety measures because of the use of methanol (combustibility, danger of explosion).

Crystalline sodium silicates are suitable as reinforcing fillers in natural and synthetic rubber, silicone rubber, plastics and paper, for cosmetic and medical applications, as carriers for oils of vegetable and animal origin and biocides and for selective absorption and thickening, and as a catalyst and catalyst support. Examples of the use in the medical and cosmetics field are cosmetic and medical creams and ointments, toothpastes, powders and face masks. Crystalline sodium silicates with a molar ratio $SiO_2Na_2O$ of 1.9:1 to 3.5:1 furthermore behave as ion exchangers and can therefore be used as water-softening agents.

Since the known processes for the preparation of these crystalline sodium silicates are very expensive, there was the object of discovering an improved process for their preparation. This should be carried out without the addition of organic solvents, and highly crystalline sodium silicates (with as few impurities as possible) should be obtained. This process should be as simple as possible to carry out and should give a product which can be comminuted without great expenditure.

The process according to the invention achieves this object. This process for the preparation of crystalline sodium silicates with a molar ratio $SiO_2/Na_2O$ of 1.9:1 to 3.5:1 from amorphous sodium silicate at elevated temperature comprises adding to water-containing amorphous sodium silicate with a molar ratio $SiO_2/Na_2O$ of 1.7:1 to 3.75:1, and a water content of 5 to 95% by weight, 0.01 to 30 parts by weight of the crystalline sodium silicate to be prepared (per 100 parts by weight of $Na_2O + SiO_2$ in the water-containing amorphous sodium silicate), dehydrating the reaction mixture by heating, and keeping the dehydrated reaction mixture at a temperature of at least 450° C., but below the melting point, until the sodium silicate has crystallized.

Water-containing amorphous sodium silicate here is understood as meaning both solid amorphous and liquid sodium silicate (water glass solution).

Water-containing amorphous sodium silicate with a water content of 5 to 95% by weight, preferably 15 to 75% by weight, is employed for the process. The reaction mixture (without seed crystals) can be prepared by dissolving precipated or pyrogenic silicic acid in sodium hydroxide solution. However, it is preferable to use the sodium silicates which are readily accessible on a large industrial scale and have a water content of 15 to 26% (for example types 3Na, 3NaTS, 5Na and 5NaTS from Société Francaise Hoechst), and in particular aqueous water glass solutions (for example Na 3/2, Na 4/1, Na 5/2, Na 6/2, Na 9/1 and Na 10/2 from Société Francaise Hoechst) with a molar ratio of $Na_2O:SiO_2$ of 1:2.01 to 1:3.50 and a water content of about 50 to 70% by weight. Sodawater glasses with a molar ratio $Na_2O:SiO_2$ of about 1:2.0 to 1:2.3 or about 1:3.3 to 1:3.5 are particularly preferred.

The modulus of the reaction mixture can be modified by addition of alkaline or acid compounds or $SiO_2$. Particularly suitable alkaline compounds here are sodium carbonate and, preferably, sodium hydroxide. It is possible to regulate the ratio $Na_2O$ (non-neutralized):$SiO_2$ by addition of an acid, such as sulfuric acid, hydrochloric acid or phosphoric acid, but this should be avoided since the salts remain as impurities in the reaction mixture. If $SiO_2$ is to be added to correct the $Na_2O/SiO_2$ ratio from altogether too alkaline starting silicates, amorphous silicic acid, in particular, is used for this. Crystalline sparingly soluble $SiO_2$ forms, such as quartz, tridymite and crystalline cristobalite should be avoided, since increased reaction times are necessary if these are used and the purity of the product deteriorates.

It is essential to add crystal feeds of the desired sodium silicate to the reaction mixture. Amounts of 0.01% by weight already have a positive influence on the crystallization; however, amounts of 1 to 15% by weight are preferred. An increase in the amount added to more than 30% by weight (based on the anhydrous content of the reaction mixture) provides no further advantages.

The composition of the crystal seeds preferably corresponds to that of the pure crystalline sodium silicates. The $Na_2O:SiO_2$ ratio is therefore in particular 1:2 or 1:3.

The $Na_2O/SiO_2$ ratio chosen in the reaction mixture is preferably identical to that in the crystalline sodium silicate added.

At least some of the crystal seeds of the crystalline sodium silicate are added to the reaction mixture before the dehydration. The remainder of the crystal seeds can also be added immediately after the dehydration. Thorough mixing is in all cases advantageous, since it promotes uniform distribution and the formation of an almost homogeneous end product. If several crystallization batches are run in succession in one reaction vessel, it is possible for the reaction vessel not to be completely emptied. The reaction mixture in this way also contains a sufficient amount of seed crystals of the crystalline sodium silicate.

Only water escapes when the processing according to the invention is carried out; the empirical molar ratio $Na_2O/SiO_2$ does not change or changes only insignificantly in that a little $Na_2O$ vaporizes. This molar ratio in the starting mixture should therefore as far as possible correspond to that in the desired product. The crystalline sodium silicate added in the form of seed crystals largely influences the molar ratio of the sodium silicate which initially crystallizes out. If, for example, the amorphous silicate has a molar ratio $SiO_2/Na_2O$ of 2.5:1 and seed crystals of Na-SKS-6 (c.f. page 8) with a molar ratio $Na_2O/SiO_2$ of 2.0:1 are added, a silicate which chiefly consists of Na-SKS-6 and contains a more silicate-rich component (for example crystobalite) in an amount such that overall a molar ratio $Na_2O/SiO_2$ of 2.5:1 results is obtained.

The temperature for the dehydration is not critical. Temperatures of 150° to 400° C. are adequate. In general, oven temperatures of 200° to 840° C. are used. However, water already starts to split off at about 140°.

In many cases, the mixture passes through a syrupy phase on dehydration, which foams as a result of the water vapor being driven off. However, when the dehydration has ended, this foamed mass is solid again.

The crystal structure is determined not only by the nature of the seed crystals but also by the crystallization temperature. This influence is already known from work without seed crystals, for example from Z. Kristallogr. 129, pages 396–404 (1969); and Glastechn. Ber. 37, 194–200 (1964).

It is surprising that the addition of crystal seeds not only considerably reduces the reaction time but also substantially improves the purity of the product. The formation of a particular crystal phase at the chosen crystallization temperature is frequently even only made possible if without crystal seeds another—in general more thermodynamically stable—crystal structure were to have been formed.

The process according to the invention can be carried out in vacuo, under normal pressure or under increased pressure. However, an increased pressure is unfavorable for the removal of water. The pressure can be, in particular, 0.1 to 20 bar during the crystallization. Nevertheless, normal pressure is preferred.

The crystallization can be carried out batchwise or continuously. The latter variant can be carried out in a flow tube or in one or more stirred kettles.

As mentioned, a silicate foam is formed during the dehydration. It is advantageous to grind the solid foam and only then to allow the silicate to crystallize, because the space required for the crystallization is in this way considerably reduced. It is also possible to carry out the first and second stage in only one apparatus, for example a heated mill. The grinding temperature is not critical. However, for economic reasons, it is advantageous not to cool the mixture for this step.

Fusion must be avoided during the crystallization, since precisely the dehydrated amorphous sodium silicate can be particularly easily converted into crystalline sodium silicates. The minimum crystallization temperature is 450° C. Temperatures between 490° and 840° C. are in general preferred. The suitable temperature is best determined in preliminary experiments. It depends, above all, on the crystal type of the desired crystalline sodium silicate and the composition thereof.

It is known that in many cases various crystalline modifications of one substance can differ in stability at different temperatures and can therefore be converted into one another, in a manner similar to the conversion of quartz into tridymite and crystobalite. For this reason, it is important, for controlled synthesis of a particular crystal type, to determine the correct reaction parameters, molar composition, temperature and time in preliminary experiments. If a particular crystal type in pure form is not required and merely any crystalline type of a sodium silicate or mixtures of crystalline sodium silicates is desired, it is of less importance to maintain particular reaction conditions.

The crystallization time can be a few minutes up to a few hours. In exceptional cases, several days or even weeks are also necessary. The crystallization time depends greatly on the crystallization temperature and the desired crystal type. Na-SKS-6 crystallizes particularly rapidly (after addition of seed crystals), and Na-SKS-7 crystallize somewhat more slowly. The crystallization of Na-SKS-11 requires several hours at a lower temperature. For Na-SKS-6, a few minutes (possibly even fractions of a minute) at about 770° to about 800° C. are sufficient. A precondition here is that a sufficiently high concentration of seed crystals is present and the supply of heat is adequate (sufficiently large heating surface).

In the process according to the invention, the reaction mixture can be hydrated and crystallized without simultaneously mixing the batch. However, it may also be advantageous periodically to mix or agitate the reaction mixture thoroughly. This can be effected, for example, in a rotary tubular oven.

The reaction vessel can be lined with metallic or ceramic materials. The surface material can thereby favor certain crystal types in a known manner.

Besides the alkali metal ions, it is also possible for other metal ions additionally to be present during the synthesis, for example boron, germanium, aluminum, indium, iron, arsenic and antimony, as well as the non-metal phosphorus. If the amount of these constituents, based on the alkali content, is less than 10%, the synthesis is influenced only insignificantly. To prepare a pure crystalline sodium silicate, it is advantageous to dispense with the addition of foreign metals during the synthesis. Larger amounts of aluminum in the starting mixture may lead to the formation of zeolitic by-products, whilst a small aluminum content, such as is present, for example, in technical grade water glass, causes no trouble.

It is an advantage of the process that it can be carried out without organic compounds.

It is known that crystalline sodium silicates with an $Na_2O:SiO_2$ ratio of 1:2 to 1:3 can be converted into the corresponding silicic acids with mineral acids. By means of structure investigations and intercalation investigations it has been demonstrated that these silicic acids have a layer-like structure. It can be assumed that the crystalline sodium silicates prepared by the process according to the invention also have a layer structure. They are therefore designated here sodium salts of layered silicic acids, or Na-SKS for short.

The characteristic X-ray diffraction lines of some crystalline sodium silicates having approximately a composition of $Na_2Si_2O_5$ are given in Tables 1 to 4. Na-SKS-5 resembles $\alpha$-$Na_2Si_2O_5$, Na-SKS-6 resembles $\beta$-$Na_2Si_2O_5$, Na-SKS-7 resembles $\beta$-$Na_2Si_2O_5$ and Na- SKS-11 resembles δ-Na₂Si₂O₅. In the relative intensity data, 0 to 25 is taken as weak, 25 to 50 is taken as moderate, 50 to 75 is taken as intense and 75 to 100 is taken as very intense.

The invention is illustrated in more detail by the following examples.

EXAMPLES

Experimental procedure

In Examples 1 to 3, in each case 20 g of sodawater glass solution (Na 9/1 from Société Francaise Hoechst with a molar $SiO_2$:$Na_2O$ ratio of 2.06 ($\pm0.05$):1; water content about 55%) are introduced into a nickel crucible which has first been cleaned either in an alkaline ultrasonic bath or in dilute sodium hydroxide solution at 100°–180° C.

The reaction vessel is then placed in an oven preheated to the chosen reaction temperature. The water is thereby rapidly driven off and the mass foams. After cooling, a foamed product is obtained.

EXAMPLE 1

(comparison example)

The crucible with the soda-water glass solution is heated at 700° C. for 1 hour without the addition of seed crystals. The X-ray diffraction diagram of the product is shown in Table 5. A mixture of Na-SKS-5 and Na-SKS-6 is obtained.

EXAMPLE 2

1.0 g of Na-SKS-5 (containing a small amount of Na-SKS-6 as impurity) is added to the water glass solution and the reaction mixture is heated at 700° C. for 1 hour. The X-ray diffraction diagram of the product is shown in Table 6. Na-SKS-5 with a small amount of Na-SKS-6 as an impurity is obtained.

Na-SKS-5 can be prepared in accordance with Glastechn. Ber. 37, 194–200 (1964). The product has the approximate composition $Na_2Si_2O_5$.

EXAMPLE 3

1.0 g of Na-SKS-6 is added to the water glass solution and the reaction mixture is heated at 700° C. for 1 hour. The X-ray diffraction diagram of the product is shown in Table 7. Na-SKS-6 is obtained.

Na-SKS-6 can be prepared in accordance with Zeitschrift für Kristallogr. 129, 396–404 (1969). It has the approximate composition $Na_2Si_2O_5$.

EXAMPLE 4

(comparison example)

A solution with a molar ratio $SiO_2$:$Na_2O$ of 1.75:1 is prepared by adding sodium hydroxide to 20 g of a sodawater glass solution with a molar ratio $SiO_2$:$Na_2O$ of about 3.3:1 (water content about 65%). The reaction mixture is heated up and heated at 550° for about 17 hours. The X-ray diffraction diagram is shown in Table 8. A mixture of Na-SKS-5 (large amount), Na-SKS-6 (small amount), Na-SKS-7 and Na-SKS-11 (small amount) is obtained.

Na-SKS-7 can be prepared in accordance with Glastechn. Ber. 37, 194–200 (1964). Na-SKS-11 can be prepared in accordance with Glastechn. Ber. 37, 194–200 (1964) and in accordance with Zeitschrift für Kristallogr. 129, 396–404 (1969).

EXAMPLE 5

1.0 g of Na-SKS-11 is added to the mixture of water glass solution and NaOH from Example 4. The reaction mixture is heated at 550° C. for about 17 hours. The X-ray diffraction diagram is shown in Table 9. Na-SKS-11 with a small amount of impurities is obtained.

TABLE 1

| Na-SKS-5 | |
|---|---|
| $d$ ($10^{-8}$ cm) | relative intensity |
| 4.92 ($\pm$ 0.10) | moderate–intense |
| 3.95 ($\pm$ 0.08) | weak |
| 3.85 ($\pm$ 0.08) | moderate–intense |
| 3.77 ($\pm$ 0.08) | intense–very intense |
| 3.29 ($\pm$ 0.07) | very intense |
| 3.20 ($\pm$ 0.06) | weak |
| 2.64 ($\pm$ 0.05) | weak–moderate |
| 2.53 ($\pm$ 0.05) | weak |
| 2.45 ($\pm$ 0.05) | moderate–intense |
| 2.41 ($\pm$ 0.05) | weak |
| 2.38 ($\pm$ 0.05) | weak |

TABLE 2

| Na-SKS-6 | |
|---|---|
| $d$ ($10^{-8}$ cm) | relative intensity |
| 4.92 ($\pm$ 0.10) | weak |
| 3.97 ($\pm$ 0.08) | very intense |
| 3.79 ($\pm$ 0.08) | moderate–intense |
| 3.31 ($\pm$ 0.07) | weak |
| 3.02 ($\pm$ 0.06) | weak–moderate |
| 2.85 ($\pm$ 0.06) | weak |
| 2.65 ($\pm$ 0.05) | weak |
| 2.49 ($\pm$ 0.05) | weak |
| 2.43 ($\pm$ 0.05) | moderate |

TABLE 3

| Na-SKS-7 | |
|---|---|
| $d$ ($10^{-8}$ cm) | relative intensity |
| 7.96 ($\pm$ 0.16) | weak |
| 6.00 ($\pm$ 0.12) | intense–very intense |
| 5.48 ($\pm$ 0.11) | weak |
| 4.92 ($\pm$ 0.11) | weak |
| 4.30 ($\pm$ 0.09) | moderate |
| 4.15 ($\pm$ 0.08) | intense |
| 3.96 ($\pm$ 0.08) | intense–very intense |
| 3.78 ($\pm$ 0.08) | moderate–intense |
| 3.63 ($\pm$ 0.07) | very intense |
| 3.31 ($\pm$ 0.07) | weak |
| 3.12 ($\pm$ 0.06) | weak–moderate |
| 3.08 ($\pm$ 0.06) | weak–moderate |
| 3.06 ($\pm$ 0.06) | moderate–intense |
| 2.97 ($\pm$ 0.06) | intense–very intense |
| 2.85 ($\pm$ 0.06) | weak |
| 2.70 ($\pm$ 0.05) | weak–moderate |
| 2.66 ($\pm$ 0.05) | moderate–intense |
| 2.63 ($\pm$ 0.05) | weak |
| 2.59 ($\pm$ 0.06) | weak–moderate |
| 2.54 ($\pm$ 0.05) | weak–moderate |
| 2.43 ($\pm$ 0.05) | very intense |

TABLE 4

| Na-SKS-11 | |
|---|---|
| $d$ ($10^{-8}$ cm) | relative intensity |
| 6.08 ($\pm$ 0.12) | weak |
| 5.88 ($\pm$ 0.12) | weak–moderate |
| 4.22 ($\pm$ 0.08) | very intense |
| 3.26 ($\pm$ 0.07) | weak–moderate |
| 3.03 ($\pm$ 0.06) | weak–moderate |
| 2.94 ($\pm$ 0.06) | moderate |
| 2.89 ($\pm$ 0.06) | weak |
| 2.64 ($\pm$ 0.05) | weak–moderate |
| 2.56 ($\pm$ 0.05) | weak–moderate |

TABLE 4-continued

Na-SKS-11

| d ($10^{-8}$ cm) | relative intensity |
|---|---|
| 2.49 (± 0.05) | weak |
| 2.43 (± 0.05) | weak |

TABLE 5

(Example 1)

| 2THETA | d | I/Io |
|---|---|---|
| 12,90 | 6,86 | 3 |
| 14,80 | 5,98 | 28 |
| 16,30 | 5,43 | 4 |
| 18,00 | 4,92 | 46 |
| 20,80 | 4,27 | 11 |
| 21,20 | 4,19 | 11 |
| 21,50 | 4,13 | 21 |
| 21,90 | 4,06 | 1 |
| 22,50 | 3,95 | 86 |
| 23,10 | 3,85 | 35 |
| 23,55 | 3,77 | 100 |
| 24,60 | 3,62 | 36 |
| 25,70 | 3,46 | 4 |
| 25,90 | 3,44 | 6 |
| 27,00 | 3,30 | 70 |
| 27,90 | 3,20 | 16 |
| 28,75 | 3,10 | 11 |
| 29,20 | 3,06 | 17 |
| 29,60 | 3,02 | 15 |
| 30,20 | 2,96 | 29 |
| 30,85 | 2,90 | 9 |
| 31,50 | 2,84 | 11 |
| 32,90 | 2,72 | 4 |
| 33,30 | 2,69 | 7 |
| 33,85 | 2,65 | 26 |
| 34,65 | 2,59 | 11 |
| 35,40 | 2,53 | 20 |
| 36,10 | 2,49 | 9 |
| 36,65 | 2,45 | 31 |
| 37,10 | 2,42 | 46 |
| 37,75 | 2,38 | 11 |
| 38,60 | 2,33 | 3 |
| 39,70 | 2,27 | 3 |

TABLE 6

(Example 2)

| 2THETA | d | I/Io |
|---|---|---|
| 14,70 | 6,02 | 6 |
| 18,00 | 4,92 | 60 |
| 21,30 | 4,17 | 6 |
| 22,50 | 3,95 | 51 |
| 23,10 | 3,85 | 53 |
| 23,55 | 3,77 | 100 |
| 24,60 | 3,62 | 8 |
| 25,65 | 3,47 | 4 |
| 25,95 | 3,43 | 4 |
| 27,10 | 3,29 | 99 |
| 27,80 | 3,21 | 20 |
| 28,80 | 3,10 | 6 |
| 29,55 | 3,02 | 9 |
| 30,15 | 2,96 | 6 |
| 30,80 | 2,90 | 3 |
| 31,50 | 2,84 | 6 |
| 32,70 | 2,74 | 4 |
| 33,95 | 2,64 | 25 |
| 35,45 | 2,53 | 17 |
| 36,10 | 2,49 | 6 |
| 36,65 | 2,45 | 38 |
| 37,10 | 2,42 | 26 |
| 37,75 | 2,38 | 17 |

TABLE 7

(Example 3)

| 2THETA | d | I/Io |
|---|---|---|
| 12,90 | 6,86 | 3 |
| 14,80 | 5,98 | 18 |
| 18,10 | 4,90 | 11 |
| 20,80 | 4,27 | 8 |
| 21,20 | 4,19 | 13 |
| 21,50 | 4,13 | 15 |
| 22,50 | 3,95 | 100 |
| 23,55 | 3,77 | 47 |
| 24,50 | 3,63 | 27 |
| 25,90 | 3,44 | 9 |
| 27,00 | 3,30 | 7 |
| 27,80 | 3,21 | 2 |
| 28,70 | 3,11 | 8 |
| 29,20 | 3,06 | 11 |
| 29,60 | 3,02 | 18 |
| 30,15 | 2,96 | 19 |
| 30,80 | 2,90 | 10 |
| 31,50 | 2,84 | 13 |
| 33,00 | 2,71 | 4 |
| 33,30 | 2,69 | 6 |
| 33,70 | 2,66 | 11 |
| 34,70 | 2,58 | 8 |
| 35,00 | 2,56 | 7 |
| 35,45 | 2,53 | 7 |
| 36,00 | 2,49 | 12 |
| 37,10 | 2,42 | 47 |
| 39,35 | 2,29 | 4 |

TABLE 8

(Example 4)

| 2THETA | d | I/Io |
|---|---|---|
| 14,90 | 5,94 | 26 |
| 18,05 | 4,91 | 56 |
| 20,75 | 4,28 | 7 |
| 21,50 | 4,13 | 12 |
| 22,45 | 3,96 | 42 |
| 23,10 | 3,85 | 48 |
| 23,50 | 3,78 | 100 |
| 24,55 | 3,62 | 33 |
| 27,00 | 3,30 | 92 |
| 27,80 | 3,21 | 20 |
| 28,70 | 3,11 | 14 |
| 29,20 | 3,06 | 28 |
| 30,00 | 2,98 | 30 |
| 30,75 | 2,91 | 5 |
| 31,50 | 2,84 | 5 |
| 33,80 | 2,65 | 31 |
| 34,60 | 2,59 | 15 |
| 35,45 | 2,53 | 18 |
| 36,60 | 2,45 | 43 |
| 37,00 | 2,43 | 57 |
| 37,75 | 2,38 | 14 |
| 42,10 | 2,14 | 4 |
| 43,20 | 2,09 | 7 |
| 45,20 | 2,00 | 7 |
| 46,00 | 1,971 | 12 |
| 46,60 | 1,947 | 12 |
| 47,90 | 1,898 | 9 |
| 48,60 | 1,872 | 21 |
| 49,50 | 1,840 | 11 |

TABLE 9

(Example 5)

| 2THETA | d | I/Io |
|---|---|---|
| 14,60 | 6.06 | 11 |
| 14,80 | 5,98 | 10 |
| 15,05 | 5,88 | 29 |
| 16,80 | 5,27 | 4 |
| 17,95 | 4,94 | 11 |
| 21,10 | 4,21 | 100 |
| 21,50 | 4,13 | 10 |
| 22,50 | 3,95 | 11 |
| 23,10 | 3,85 | 9 |
| 23,50 | 3,78 | 19 |
| 23,90 | 3,72 | 5 |

TABLE 9-continued (Example 5)

| 2THETA | d | I/Io |
|---|---|---|
| 24,50 | 3,63 | 12 |
| 25,00 | 3,56 | 5 |
| 25,75 | 3,46 | 5 |
| 26,00 | 3,42 | 5 |
| 27,00 | 3,30 | 19 |
| 27,40 | 3,25 | 15 |
| 27,70 | 3,22 | 7 |
| 28,40 | 3,14 | 6 |
| 28,75 | 3,10 | 8 |
| 29,50 | 3,03 | 35 |
| 30,10 | 2,97 | 19 |
| 30,45 | 2,93 | 30 |
| 31,00 | 2,88 | 8 |
| 32,50 | 2,75 | 2 |
| 33,35 | 2,68 | 10 |
| 34,00 | 2,63 | 25 |
| 34,20 | 2,62 | 17 |
| 35,05 | 2,56 | 22 |
| 35,80 | 2,51 | 5 |
| 36,60 | 2,45 | 8 |
| 37,00 | 2,43 | 19 |
| 37,80 | 2,38 | 4 |
| 38,95 | 2,31 | 9 |
| 40,00 | 2,25 | 2 |
| 40,60 | 2,22 | 5 |
| 41,50 | 2,17 | 5 |
| 42,05 | 2,15 | 7 |
| 44,20 | 2,05 | 3 |
| 46,00 | 1,971 | 4 |
| 48,10 | 1,890 | 5 |
| 48,70 | 1,868 | 5 |

I claim:

1. A process for the preparation of crystalline sodium silicates with a molar ratio $SiO_2/Na_2O$ of 1.9:1 to 3.5:1 from amorphous sodium silicate at elevated temperature, which comprises adding to water-containing amorphous sodium silicate with a molar ratio $SiO_2/Na_2O$ of 1.7:1 to 3.75:1, and a water content of 5 to 95% by weight, 0.01 to 30 parts by weight of the crystalline sodium silicate to be prepared (per 100 parts by weight of $Na_2O+SiO_2$ in the water-containing amorphous silicate), dehydrating the reaction mixture by heating, and keeping the dehydrated reaction mixture at a temperature of at least 450° C., but below the melting point, until the sodium silicate has crystallized.

2. The process as claimed in claim 1, wherein 1 to 15 parts by weight of the crystalline sodium silicate to be prepared (per 100 parts by weight of $Na_2O+SiO_2$ in the water-containing amorphous sodium silicate) are added to the water-containing amorphous sodium silicate used.

3. The process as claimed in claim 1, wherein the amorphous sodium silicate used has a water content of 15–26% by weight.

4. The process as claimed in claim 1, wherein the sodium silicate used has a water content of 50–70% by weight.

5. The process as claimed in claim 1, wherein both the amorphous water-containing sodium silicate and the added crystalline sodium silicate have a molar ratio $SiO_2/Na_2O$ of 1.7:1 to 2.3:1.

6. The process as claimed in claim 1, wherein the dehydrated reaction mixture is comminuted mechanically and is then kept at a temperature which is at least 450° C.

7. The process as claimed in claim 1, wherein the added crystalline sodium silicate has a molar ratio $SiO_2/Na_2O$ of about 2:1.

8. The process as claimed in claim 7, wherein the added sodium silicate has X-ray spectra in accordance with Table 2.

9. The process as claimed in claim 8, wherein the crystallization is carried out in the range from 700° to 800° C.

10. The process as claimed in claim 9, wherein the dehydrated reaction mixture is heated at 700°–770° C. for 1–80 minutes.

11. The process as claimed in claim 9, wherein the dehydrated reaction mixture is heated at 770°–800° C. for 1–12 minutes.

* * * * *